Dec. 20, 1966          J. SHAPIRO          3,292,952
                    HYDRAULIC FITTINGS
Filed June 15, 1965                    2 Sheets-Sheet 1
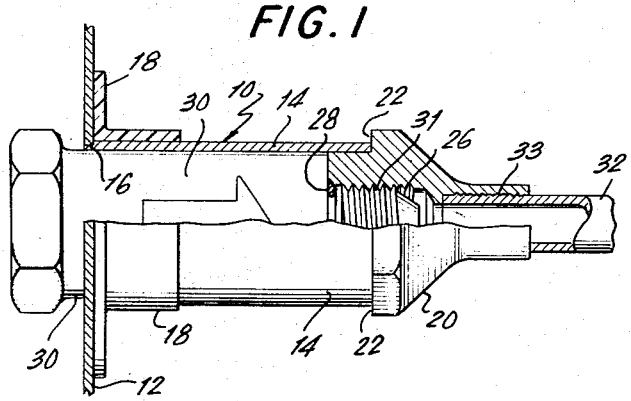
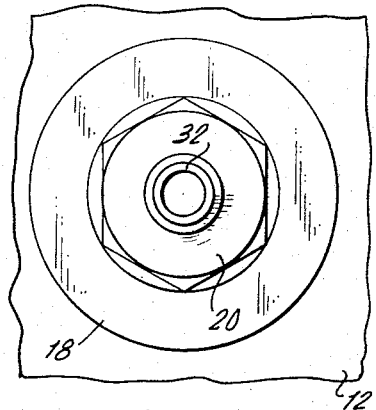
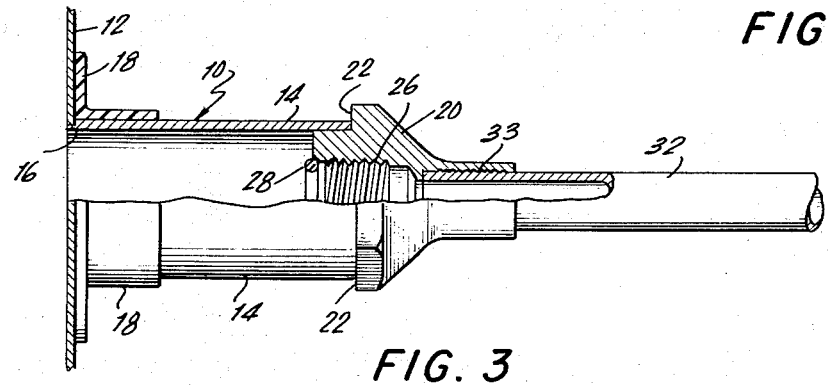
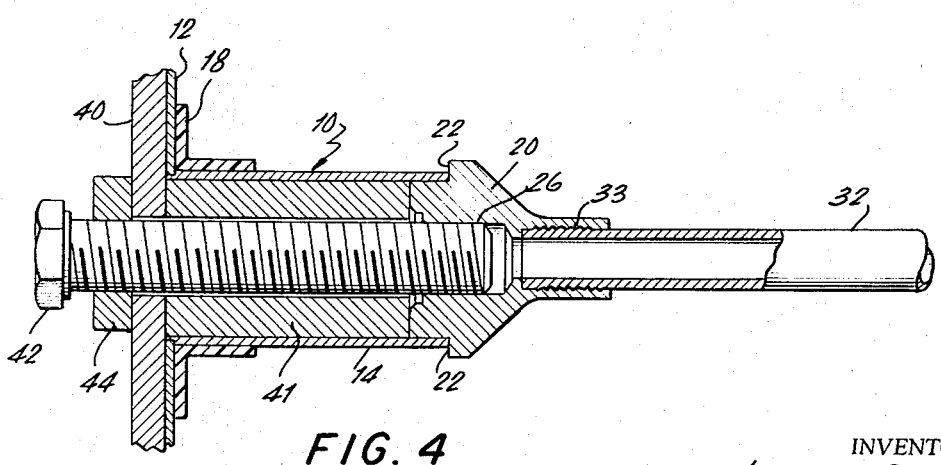
INVENTOR.
JOSEPH SHAPIRO
BY Jacobs & Jacobs
His ATTORNEYS Dec. 20, 1966    J. SHAPIRO    3,292,952
HYDRAULIC FITTINGS Filed June 15, 1965    2 Sheets-Sheet 2

INVENTOR.
JOSEPH SHAPIRO
BY Jacobs & Jacobs
His ATTORNEYS

United States Patent Office 3,292,952
Patented Dec. 20, 1966

3,292,952
HYDRAULIC FITTINGS
Joseph Shapiro, 1110 Wisconsin St.,
Pomona, Calif. 91767
Filed June 15, 1965, Ser. No. 464,165
5 Claims. (Cl. 285—158)

This application is a continuation-in-part of my copending application Serial Number 65,125, filed October 26, 1960, now abandoned.

The present invention is concerned with integrated, modular, hydraulic manifold systems. More particularly it is concerned with improved, accessible cartridge-type fittings for use in such manifold systems.

A new fabrication process has recently been devised which involves the fabrication of hydraulic manifold systems. The process provides for the enclosure of check and relief valves, flow limiters, filters and other cartridge-type components within a manifold. This enclosure is such that these cartridge components themselves remain accessible for adjustment or replacement purposes. This is achieved by mounting the cartridge components in suitable, accessible fittings (housings) which extended into the interior of the manifold, and yet which permit the components to be removed for repair or replacement purposes. The present invention is directed to an improved construction for such manifold systems and fittings and to an improved method for assembling such fittings into the manifold system.

Formed tubing conduits, and their deep-access fittings are joined in proper circuitry, and after passing established proof test procedures are secured within a cured reinforced contoured plastic outer shell. They are then encapsulated by use of a foamed phenolic, epoxy, or hollow spheres of glass, metal, or phenolic, and a suitable bonding agent. The joining can be done by brazing, welding, soldering, adhesive bonding, etc. This material serves as a vibration damper, heat insulator and mounting structure, or to allow space for a heat sink material. This type of manifold system is advantageous in that it is lighter and more efficient than the all-metal systems of the same general type. Moreover, the joined manifold systems are less effected by environmental conditions, such as acceleration, vibration, shock, salt spray, temperature changes, and the like. The manifold systems also are advantageous in that they can be proof tested and modified either prior to encapsulation or even modified after the final packaging operation. In addition, such manifold systems are comparatively inexpensive to fabricate, and they require no critical materials for either tooling or fabrication.

The manifold systems referred to in the preceding paragraphs may comprise, for example, a hard reinforced shell of any desired thickness and which shell may comprise for example, fiberglass, other reinforced material or inorganic material. The various hydraulic components in the manifold system are supported in accessible fittings, as mentioned, and these fittings abut the reinforced shell and extend into the interior of the manifold system. The inter-connecting tubing for the hydraulic circuitry is disposed within the shell. The tubing is essentially a free-standing structure disposed within the shell; the shell is basically a surface covering for appearance and to shield against external physical damage. The fittings and the inter-connecting tube within the shell are finally encapsulated by a filler of vibration damping material which also acts as a heat insulating or heat sink material. This filler is chosen to provide satisfactory characteristics under specific environmental conditions, of the type mentioned above.

An advantage of the present invention lies in the use of an improved accessible fitting in a manifold system of the type above described in such a way that the fitting serves to support a hydraulic component in a position in that manifold system so that the component is protected by the manifold system from external heat, shock, and vibration.

Another advantage of the invention is the provision of such an improved fitting which is constructed to support its hydraulic component in the manifold in a position to render the compenent easily accessible, so that the cartridge-type hydraulic component may easily be removed for repair, adjustment or replacement purposes, and yet to support the component in a position in the manifold system such that the component is isolated from external heat, shock and vibration.

Another advantage of the present invention is to provide an improved process and method for assembling one or more of such fittings of the type referred to within the thin-walled structure of a joined manifold system in a manner such that all necessary connections can be made to the fitting without producing excessive torques or bending moments on the fitting, on the wall, or on the shell, of the manifold.

In the drawings:

FIGURE 1 is a side view, partly in section, of an improved fitting assembly representative of one embodiment of the invention mounted through the wall of a manifold system and receiving and supporting an hydraulic component;

FIGURE 2 is an end view of the assembly of FIGURE 1, taken from the right of FIGURE 1;

FIGURE 3 is a view, like FIGURE 1, but with the hydraulic component removed from the fitting assembly;

FIGURE 4 is a sectional view of the fitting assembly of FIGURES 1–3, together with appropriate jigs and fixtures which are used in disposing the fitting assembly through a wall, or shell, of the manifold, and in permitting the assembly to be attached to the wall without producing excessive forces on the wall, or on the fitting itself;

Figure 5:
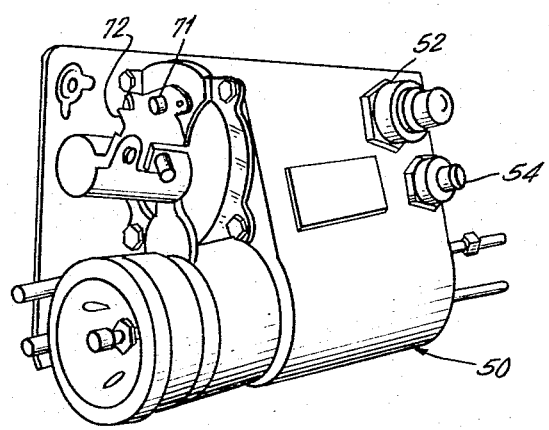
FIGURE 5 is a perspective view of a manifold system of the type under consideration.

The improved fitting assembly of the embodiment of my invention is designated as 10 in FIGURES 1–3. In FIGURE 1, the fitting assembly is mounted on the inner surface of the reinforced shell 12 of a manifold system. This shell may be constructed of reinforced fiberglass, for example, as well as other materials, as mentioned above.

The fitting assembly 10 includes a tubular member 14, which may be cylindrical, or any other desired shape. The left-hand end of the member 14 in FIGURE 1 has an annular peripheral shoulder 16 machined in its outside diameter. This shoulder mates with a pre-machined hole of mating diameter in the reinforced shell 12. A second tubular member, or bushing, 18 having a radially extending flange portion, is used to mount the tubular member 14 on the shell 12. The bushing 18 may be cylindrical in shape, for example, corresponding to the shape of member 14. The bushing 18 may be attached to member 14 and to shell 12, as for example, by adhesive bonding or by any other suitable bond or joining process. The bushing 18 may also be a preformed piece and it may be composed, for example, of molded or reinforced plastic, or stamped or cast metal.

The assembly 10 includes a fitting 20 which may be metallic and which may have an hexagonal shape. The fitting 20 is illustrated as having a truncated conical configuration so as to have a large end and a small end. An annular shoulder 22 is machined on the outer surface of the large end of the fitting 20, and this shoulder serves to receive the right-hand end of member 14. Member 14 may be attached to fitting 20 by a suitable bond. It should be noted that the bond should be applied to annualr shoulder 22, rather than to member 14, so as to prevent any of the bonding material from forming on the hydraulic sealing surface of the left-end of fitting 20.

The fitting 20 has a female threaded portion 26 in its large end (this structure is shown in detail in Douglas Aircraft Company's Standards Manual for Air Force-Navy Aeronautical Design Standard AND 10050) which is adapted to receive a suitable male thread 31 (this structure is shown in detail in Douglas' Standards Manual supra, MS33656 or MS33514) of any appropriate hydraulic component 30 of a predetermined diameter and fit (this is shown in detail in Douglas' Sstandards Manual, supra AND 10064). An O-ring (described in detail in Douglas' Standards Manual, supra AN 6290) or other suitable hydraulic seal, 28 is mounted at the thread undercut to the left of threaded portion 26, to form an appropriate hydraulic seal for the male threaded portion of hydraulic component 30. Hydraulic component 30 extends through a cast or otherwise preformed hole in manifold shell 12 and into fitting assembly 10. The male threaded end portion 31 of component 30 is threaded into the threaded female portion 26 of fitting 20. Hydraulic component 30, may, for example, be a check valve, a filter, a relief valve, or any other external cartridge fitting.

The machining of the annular shoulder 22 on the large end of fitting 20 may be, for example, on the order of one-quarter of an inch. The dimensions may be such that the corners only of the hexagon need be removed to form shoulder 22, because the flat of the hexagon can be made with the proper diameter for engagement with tubular member 14.

The outside diameter of tubular member 14 is not particularly important. However, the length of tubular member must be properly related to the length of hydraulic component 30. If tubular member 14 is too long, the end of hydraulic component 30 would abut against shell 12, and this would prevent O-ring 28 from making a proper seal on left-end of fitting 20. Were this not done, the fitting would bottom before a seal was accomplished. On the other hand, if tubular member 14 is too short as compared with the length of hydraulic component 30, the fitting assembly 10 would not provide the total desired vibration damper, heat sink and heat isolation for which it was constructed.

Tubing 32, or an equivalent conduit of plastic, metal or any other suitable material, is fitted into a counter-bored hole in the small end of fitting 20. This tubing may be joined to fitting 20 by a suitable joining process such as brazing, welding, soldering, etc. As before, the joining agent is applied to tubing 32, rather than to the inner wall of the counterbore in fitting 20, as to prevent contamination by any joining process from entering the fluid area inside the fitting and tube assembly.

For all fittings and tubes to be joined, such as tubing 32 in fitting 20, the abutting end of the tubing and of the counter-bored hole should be squared, and the surfaces to be joined may be either serrated, threaded, annular ringed, smooth finished and polished without linear scratches, or knurled, as at 33. However, these serrations, etc., should terminate short of the ends of the counter-bored hole in the fitting 20 and short of the squared end of the tubing 32. The reason for this is that the squared end of the counter-bored hole and the squared end of the tubing 32 prevent any of the adhesive from forming a flash, protruding from the joint, where the square ends mate. In this manner, the pneumatic or hydraulic pressure only sees the inside diameter. The reason for the ends of the counter-bored hole in the fitting 20 and of the tubing 32 being kept free of threads, serrations, is that any bending of the tubing 32 might cause a stress failure at the end of the tubing or of fitting 20 because of material removed by the serrations. The depth of penetration of the serrations, threads, rings or knurls can be varied as a function of the tubing wall thickness. They should not exceed a nominal 10 to 15 percent of wall thickness. As shown in FIGURES 1 and 2, the tubing 32 should be dimensioned relative to the counter-bored portion of fitting 20, so that the pneumatic or hydraulic pressure sees only the inside diameters of the fitting and tubing. No tubing is joined until all the tubing for the entire manifold circuitry is completed, i.e., formed, ends squared, polished, knurled, etc., then the entire skeletal system is joined at one time. After the joining, the skeletal system is taken to proof pressures and Acceptance Test Procedure (ATP) can take place.

A mold or die jig 40 is provided for assembly and location of deep access fittings. A tubular spacer or bushing 41 is inserted inside the tubular member 14. The bushing 41 has an outer diameter which very closely approximates the inner diameter of the tubular member 14, and allows for maximum diameter 30 instead of the nominal diameter of 30 (should it go to maximum tolerance). A bolt 42 is inserted through a hole in the jig 40, through the hole in the shell 12 and through spacer 41 which it just clears. The bolt 42 has threads 31' which mate with the female threaded portion 26 of the fitting 20. A nut 44 should be previously threaded onto the bolt 42, and as the nut is tightened against the mold or jig 40 it enables the bolt to hold all the elements in an assembled position against the mold or jig.

The illustrated support of the assembly in FIGURE 4 permits the tubing 32 to be formed, bent, routed, etc., with the fitting firmly in place and properly positioned. The support of the fitting assembly by bolt 42 also permits the joining of the tubular member 14 and fitting 20, of bushing 18, shell 12 and tubular member 14, and of tube 32 and fitting 20 to be done. The use of bolts like 42 enables all the above operations to be carried out without the need for using the actual hydraulic components such as component 30 during the joining operations.

Therefore, the use of the mold or jig die 40, bushing 41 and bolt 42 permits fitting assembly 10 to be held firmly in place. Thin shell 12 is installed after final testing of the skeletal system and all the necessary fitting and joining operations have been performed just prior to encapsulation. The resulting fitting assembly, provides a deep access fitting for the hydraulic components, such as component 30. Such cartridge components may be supported by fitting 10 within the manifold system, and yet be accessible for replacement purposes.

In FIGURE 4 the fitting assembly is shown as being supported against wall 12 of the manifold system. It should be pointed out that fitting 10 and other fittings like it may be supported and fabricated. A skeletal system of tubing and deep-access fittings may be joined to form an assembly, which can now have assembled to it, all the final cartridge items, such as high and low pressure relief valves, check valve, filter, etc., plus the pistons, end-caps, seals, fittings, and O-rings for the accumulator and reservoir, as well as the high and low pressure quick-disconnects, and other non-cartridge components. The assembled skeletal system may now be proof tested, cycled, etc. A spacer could only be used for proof pressures, and not for cycling components or for an Acceptance Test Procedure. A spacer which stimulates a live component can be used during the test and check-out.

A typical final assembled manifold system is illustrated in FIGURE 5 in finished condition; the system is designated generally as 50. The finished skeletal manifold system may be encapsulated, as mentioned, in plastic or other suitable material. The aforementioned encapsulation may contain a suitable filler, for example, of heat insulating material, or of heat conducting material to form a heat sink.

Fittings constructed in accordance with the present invention may be mounted on the skeletal manifold system. Such fittings are designated 52 and 54 in FIGURE 5. Appropriate hydraulic components may be supported by the fittings in an accessible interface position, and as described, these components are removable for adjustment or replacement purposes. The appropriate hydraulic components are designated 71 and 72. These components may be, for example, check or relief valves, flow limiters, filters, and so on.

Figure 6:
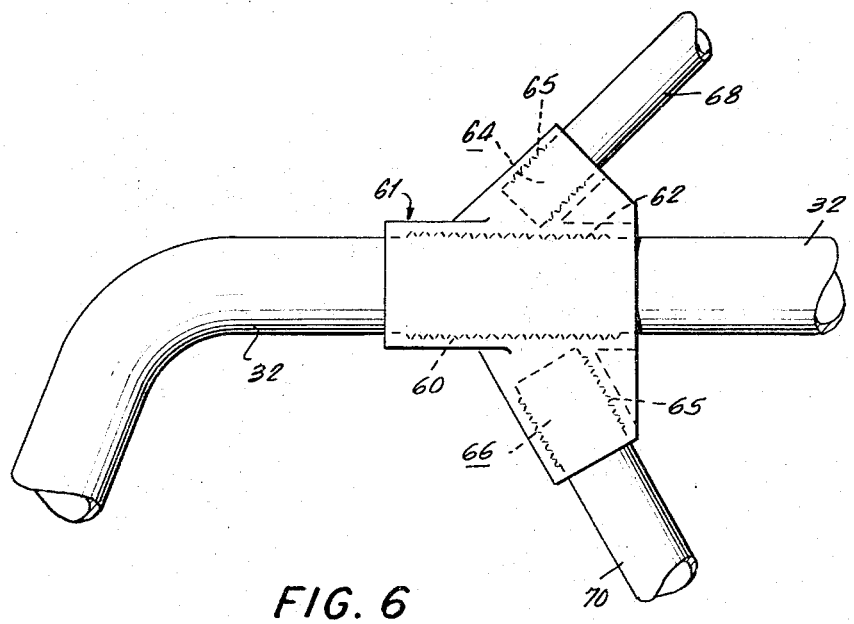
FIGURE 6 is a plan view of a manifold system wherein tubes within the system are joined together.

The tubing 32 may be joined and coupled to other tubing in the manifold system in the manner shown in FIGURE 6. A portion of the surface of tubing 32 is prepared by smooth finishing and polishing, or by forming serrations, threads, rings or knurls therein; these being designated generally as 60.

A junction block 61, having a central hole therein, is then placed over the knurled portion 60 of the tubing 32. The bore of block 61 is treated in a manner similar to the surface 60 to form a smooth polished surface, or to form serrations, threads or the like therein; these being designated generally as 62 in FIGURE 6. This junction block 61 may be formed of plastic, metal or any other suitable material.

The junction block 61 also may include pockets 64 and 66 which are inclined with respect to the central hole in block 61. Further tubings 68 and 70 are fitted into pockets 64 and 66. The bore of pockets 64 and 66 are serrated, other otherwise treated as suggested above, and the ends of tubings 68 and 70 are likewise treated at 65. The treatment of the bores of the pockets and of the ends of the tubings is accomplished similarly to that of the tubing 32 and of the counter-bored hole in the fitting 20.

The tubing 32 would have the location of the serrated portion of its surface properly established, and the surface prepared in the manner described, and the tubing would then be properly positioned prior to joining. The junction block 61 can be made from a single piece of metal, or plastic that would not need separate heat treating, stress relieving or annealing. More specifically, after the tubings 68 and 70 are formed and positioned, they are removed from block 61. The block 61 is then oriented correctly and joined to tubing 32. The holes are then drilled in the block 60 and through tubing 32, to mate with the inner diameters of tubings 68 and 70. The tubings 68 and 70 are then reinserted and joined to block 61.

The tubings 32, 68 and 70 may be joined to the junction block by a suitable bond using any suitable joining process. This joining may be carried out in a manner similar to that described in conjunction with tubing 32 and fitting 20. If desired, junction block 61 can have a space and depth for any number of additional tubes in place of, or in addition to, pockets 64 and 66.

The invention provides, therefore, an improved manifolding technique which allows fittings to be mounted accessibly within and protruding through or flush with the thin wall of an integral modular manifold system. The invention also provides an improved fitting method for such a purpose which serves to support a component in the manifold system, the component being readily accessible for adjustment or replacement purposes. Other and further uses and advantages will be fully appreciated by those skilled in the art, by reference to the foregoing specification and the appended claims.

What is claimed is:
1. A fitting assembly for supporting components in a manifold system in a position easily accessible for repair and replacement which comprises:
  (a) a tubular component-receiving member having an annular peripheral shoulder on its outer surface which mates with a corresponding aperture in a wall of the manifold system, said component having a male threaded portion along the end which mates with a fitting;
  (b) a flanged tubular member at least partially engaging said component-receiving member at the end which receives said component and which extends to and is attached to a wall of said manifold system, said wall being provided with an aperture which is concentric with said component-receiving member;
  (c) a fitting having a large end and a small end, said fitting having a female threaded boss portion on the interior surface of its large end which receives the male threaded end of the component, said fitting being bonded at its large end to the mating end of said component-receiving member, a component extending through said aperture and attached to said fitting;
  (d) an hydraulic seal disposed within said fitting adjacent the mating attachment end, sealingly engaging said component and said fitting; and
  (e) conduit means connected to the other end of said fitting.

2. A fitting assembly according to claim 1, wherein:
  (a) the small end of said fitting has a counterbored hole therein; and
  (b) said conduit means is a tube one end of which fits into said hole
    whereby the end of said tube and the male threaded end of said component are adjacent.

3. A fitting assembly according to claim 2, wherein said fitting has a nominally truncated conical configuration.

4. A fitting assembly according to claim 3, wherein the abutting surfaces of said counter-bored hole and said tube end are serrated and the serration terminates short of the end of said hole and said tube.

5. A fitting assembly for supporting hydraulic components having a male threaded end in a thin walled, joined manifold system in a position which makes them readily accessible for repair, adjustment, or replacement which comprises:
  (a) a first tubular member having an open component-receiving end and an open fitting-receiving end, and having an annular peripheral shoulder on the outer surface of its component receiving end which mates with a pre-machined hole in a wall;
  (b) a flanged second tubular member engaging at least the component receiving end of said first member and bonded thereto, said flanged second tubular member being attached to said wall;
  (c) a fitting of truncated conical configuration having a shoulder portion abutting said fitting-receiving end of said first member and being attached to the fitting-receiving end of said first member, said fitting being female threaded on only the end portion nearest the wall and being provided with a thread undercut therein, said fitting having a counterbored hole in the other end thereof, said hole having a serrated surface on only the end portion of the interior surface thereof and terminating short of the end;
  (d) an hydraulic static O-ring seal at the thread undercut of the female threaded portion of said fitting; and
  (e) a tube open at both ends, at least one end having a smooth finish on the end portion and a serrated portion adjacent thereto which terminates short of the end, whereby the serrated surfaces of the hole and the tube provide a close fit and the smooth finished portion of the end of said tube abuts the end of said counterbored hole, said tube being bonded to said fitting.

References Cited by the Examiner

UNITED STATES PATENTS

| | | | |
|---|---|---|---|
| 695,066 | 3/1902 | MacClain et al. | 285—333 |
| 886,888 | 5/1908 | Stewart | 285—46 X |
| 956,294 | 4/1910 | Corcoran | 285—287 X |
| 1,054,812 | 3/1913 | Zierath | 285—330 X |
| 1,072,208 | 9/1913 | Dahl | 285—287 X |
| 1,299,396 | 4/1919 | Coleman | 285—286 X |
| 1,497,952 | 6/1924 | Smith | 285—21 |
| 1,801,171 | 4/1931 | Mueller et al. | 285—287 |
| 1,897,320 | 1/1933 | McKnight et al. | 29—157.4 |
| 1,992,200 | 2/1935 | Ford | 285—158 X |
| 1,995,546 | 3/1935 | Meier | 29—493 |
| 2,093,513 | 9/1937 | Campbell | 285—287 X |
| 2,292,329 | 8/1942 | Sisk | 285—155 |
| 2,366,164 | 1/1945 | Weick et al. | 29—493 |
| 2,382,489 | 8/1945 | Koppel | 285—55 X |
| 2,397,290 | 3/1946 | Rasmussen | 285—158 |
| 2,445,358 | 7/1948 | Maechtlen et al. | 285—158 |
| 2,710,443 | 6/1955 | Webb | 29—157.4 |
| 2,762,635 | 9/1956 | Lorber | 285—155 |

D. W. AROLA, *Assistant Examiner.*

THOMAS F. CALLAGHAN, *Primary Examiner.*